United States Patent [19]

Cicatelli

[11] 4,101,949
[45] Jul. 18, 1978

[54] SINGLE CONTROL KEY FOR TAPE RECORDERS

[75] Inventor: Rodolfo Cicatelli, Lugano, Switzerland

[73] Assignee: Autovox S.p.A., Rome, Italy

[21] Appl. No.: 768,468

[22] Filed: Feb. 14, 1977

[30] Foreign Application Priority Data

Feb. 16, 1976 [IT] Italy .............................. 48110 A/76

[51] Int. Cl.² .................. G11B 5/54; G11B 21/22; G11B 15/00
[52] U.S. Cl. ................................... 360/137; 360/96; 360/105
[58] Field of Search ...................... 360/137, 96, 105

[56] References Cited

U.S. PATENT DOCUMENTS 3,632,113  1/1972  Nakamura ............................. 360/96

Primary Examiner—Robert S. Tupper
Attorney, Agent, or Firm—James W. Gillman; Phillip H. Melamed

[57] ABSTRACT

A single control key rotatable with respect to the frame of a tape player is disclosed. The control key comprises a shaft and a rectangular in cross section cam attached to the shaft. Projecting tabs are provided on the cam and spaced 90° apart with respect to the rotation of the shaft. The cam acts against a fulcrumed lever to control the operative position of a pinch roller and a magnetic head. The projections act in conjunction with another lever and its projection to control tape speed.

10 Claims, 4 Drawing Figures

SINGLE CONTROL KEY FOR TAPE RECORDERS

BACKGROUND OF THE INVENTION

It is known that in tape recorders, and particularly cassette tape recorders, it is often suitable to have a single control key which performs one or more of the following operations: lowering of the cassette, or lifting of the tape player mechanical engaging members (i.e., capstan, reel clutches, etc.); introduction of the magnetic heads and pressure roller into their proper seats for a normal operation mode; temporary withdrawal of the heads and pressure roller, with speed and sense changing for the drive system for fast modes of operation; reversal of the first two steps at the end of tape player operation; and ejection of the cassette from the tape player. It is also known that there exist some tape players wherein separate control keys are provided which perform the various operations. Also known are tape players in which a single control key performs such operations by utilizing an axial displacement for control of the insertion and/or ejection functions and lateral displacements for control of fast tape player modes of operation. This latter solution limits the spacing of the tape deck frame from the outer front face of the apparatus because the necessary angle of lateral displacement, predetermined by operation requirements, requires an extension of the control arm and this extension is a function of said spacing. Moreover, since the controlling force required for the fast modes of tape player operation is sometimes greater than for other sequences this results in "hard" lateral operations.

SUMMARY OF THE INVENTION

An object of the present invention is to provide a simplified and improved single control key for a tape player which overcomes the aforementioned deficiencies.

A more specific object of the invention is to provide a single control key which selectively controls fast forward and rewind operations by rotating the control key through 90°. This rotation of the control key also successively controls a number of functions without resorting to gear means, etc. On the other hand, the control key can still carry out, by sliding axially, all or any of the other previously mentioned functions.

A single control key for tape recorders, according to this invention, comprises a shaft, rotating with respect to the frame, an outer body fixed into the shaft, a cam fixed to the shaft, said cam being rectangular in cross section; and projecting tabs provided on a portion of one of the smaller faces of the cam, and spaced apart substantially through 90°.

The invention can also be stated as comprising a control key for use in tape recorders having a frame, a speed and/or tape running direction variator (controller), and a pressure roller and magnetic head at least one of which is movably mounted to the frame. The control key comprises a shaft rotatable with respect to the frame, an outer body fixed to said shaft for manually rotating said shaft, a cam fixed to said shaft, said cam being rectangular in cross section, and projecting tabs rotatable with said shaft and spaced substantially apart, whereby the rotational position of said rectangular cam controls one function of said tape player and the rotational positions of said tabs control another function of said tape player.

In accordance with this invention the control key has a rectangular shaped cam and two tabs. The cam and tabs, by engaging suitable levers, perform the required operations without resorting to gearing couplings. A feature of the present invention is that the control key has an inoperative rest position and two symmetric operative positions able to automatically return back from the latter positions to the former position upon removal of a clamping force, as will be fully detailed below.

BRIEF DESCRIPTION OF THE DRAWINGS

The invention will be more fully understood with reference to the accompanying drawing, wherein.

DESCRIPTION OF THE PREFERRED EMBODIMENT

Figure 1:
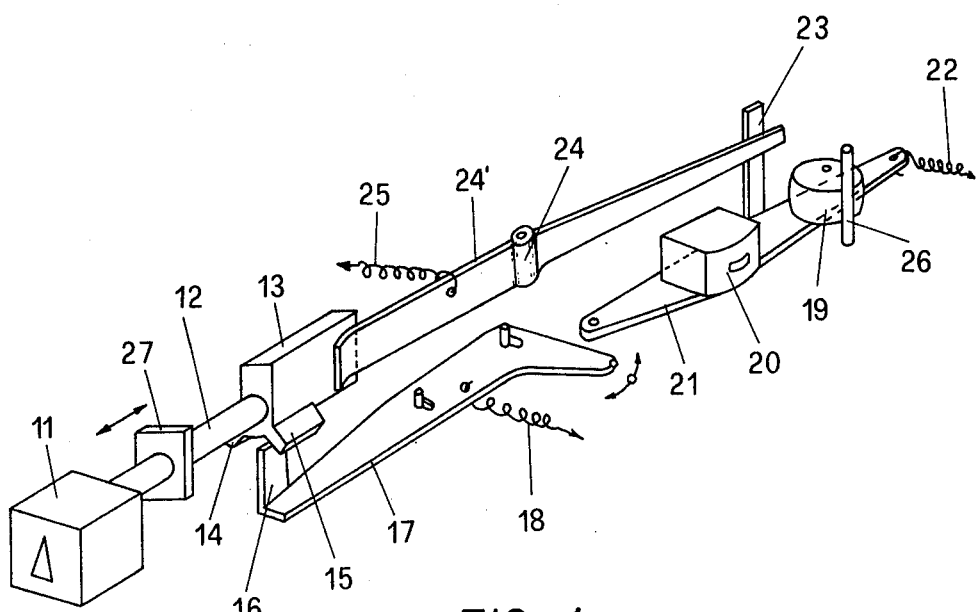
FIG. 1 is a perspective view diagrammatically showing an embodiment of the invention.

With reference to the drawing, and in particular to FIG. 1, a control key for a tape player according to the present invention comprises an outer body or button 11 to which, throug a shaft 12, a cam 13 is connected. The control key is rotatable about the axis of the shaft 12. The shaft 12 is axially slideable with respect to the frame (not specifically shown) of the tape player. The shaft 12 is guided in its axial movement by an element 27 which is fixed with respect to the frame, the direction of possible axial movement of the shaft 12 is indicated by the arrows adjacent to the element 27.

The cam 13 is rectangular in cross section in a plane perpendicular to the axis of shaft 12 for the reasons that will be stated later. At a portion of the cam 13, two tabs 14 and 15 are provided and are positioned and adapted to selectively engage and encompass an upward lug 16 of a control lever 17 of a tape speed and/or running direction variator (controller), an element well known in the art. The tabs 14 and 15 are spaced 90° apart with respect to the rotation of the shaft 12 and they control the position of the lever 17 in response to rotation of the control key. The lever 17 is held in a center rest position and restrained from any movement by a return spring member shown diagrammattically at 18. The lug 16 is positioned between the tabs 14 and 15 which are rigidly mounted to the shaft 12 through the cam 13 and are therefore integrally rotatable with the shaft 12.

An assembly comprising a pressure roller 19 and a magnetic head 20 is carried on a rocking support 21, per se already known, pivotally mounted to the tape player frame and held by a return spring member 22 in a position wherein the pressure roller contacts a capstan 26 located at a position fixed with respect to the tape player frame. The rocking support 21 has upward projection 23, the function of which will be explained subsequently.

Against the rectangular cross section portion of the cam 13 there normally abuts an end of a lever 24. This lever 24 is properly fulcrumed and the end, which is part of an arm 24', is held in contact with cam 13 by an elastic return member, such as a spring 25. Between an end of the lever 24, which is opposite to the end contacting the cam 13, and the projection 23 of the rocking support 21, there normally exists a certain gap or space when both members are in the positions shown in FIG.

Figures 2A, 2B, 2C:
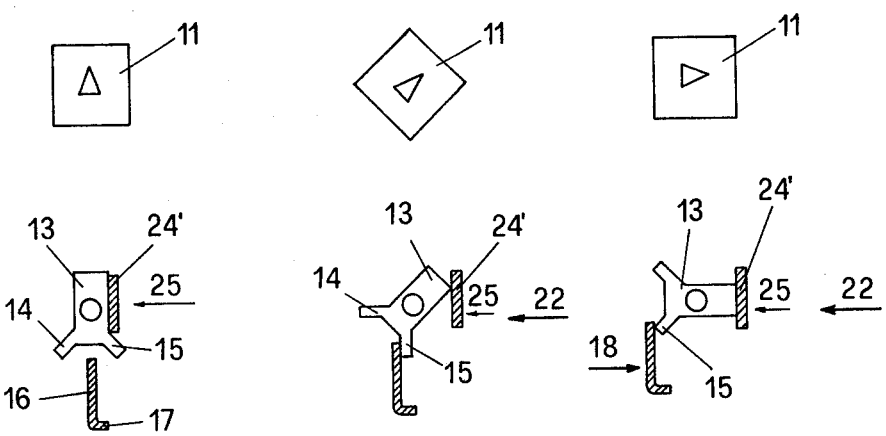
FIGS. 2a, 2b, and 2c schematically show various positions of the control key and its operating cam and how they control various associated levers.

1 or FIG. 2a. The function of this gap will be explained subsequently.

Pins about which the levers 24, 17 and 21 oscillate, as well as the center line of the capstan 26, are fixed with respect to the frame of the tape player.

The end of the lever 24 that is part of arm 24' constantly is in contact with the surface of the cam 13, and this occurs because of the spring 25. In the rest position of the button 11, as best shown in FIG. 1, the end of the arm 24' bears against the cam 13, whereas the opposite end of lever 24 is slightly spaced from the projection 23 of the support 21. The relationships between the lever 24 and lug 16 of the lever 17 are best shown in this rest position in FIG. 2a.

If cam 13 is rotated clockwise by an angle of about 45°, the assembly will be in the position diagrammatically shown in FIG. 2b wherein the lug 16 of lever 17 is in contact with the inner surface of the tab 15 and the lever 24 is rotated through a corresponding angle about its fulcrum due to the end of the arm 24' of lever 24 bearing against the upper edge of cam 13. In this condition, a force acts against this edge of the cam 13 including the spring force applied by the spring 25, and the spring force of the spring 22 which is applied through the lever 24 and the projection 23. It should be appreciated that the movement of the lever 24 caused by this 45° rotation first closes the gap between its end and the projection 23, and subsequently moves the support 21 which results in displacing the pressure roller 19 and head 20 away from their normal operating positions.

By rotating the cam 13 further clockwise, the arm 24' of the lever 24 will abut against the flat upper surface of the cam 13, while the lever 17, by means of its lug 16, bears against the edge of tab 15 of the cam 13. This situation is shown in FIG. 2c. At this point, the force acting against the cam 13 includes the elastic forces of the springs 25 and 22, which tend to press the lever 24 against the above mentioned upper surface of the cam 13, in addition to a force against the edge of the tab 15 by way of the lug 16 and spring 18. The cam 13 is contemplated as being in a clamped condition in this position since the torque produced by the spring 18 is insufficient to overcome the combined torque forces of the coacting springs 22 and 25, wherein spring 22 is considered to apply a clamping force.

The control arrangement in this position (FIG. 2c) is ready for a fast forward operation. If, however, a fast rewind is desired, rotating the button 11 in the opposite (counterclockwise) direction will result in the same sequence of operations, but now the tab 14 and the lower surface of the cam 13 will be involved. In both of such operative positions of the button 11, and thus the cam 13, if for any reason, such as the actuation of any control mechanism when the tape stops at the end thereof, the clamping force of spring 22 is removed, since the torque applied from the spring 18 is higher than that applied by the spring 25 along, the cam 13 will tend to rotate shifting from the position, such as that shown in FIG. 2c, to the position shown in FIG. 2b. In the position in FIG. 2b, the force of spring 25 alone is now able to reset the cam 13 into the rest position shown in FIG. 2a.

Since the shaft 12 is guided by the element 27 which is fixed with respect to the frame, the shaft 12 and any associated elements thereof may effectuate any axial stroke adapted to perform one or more of the other various control functions mentioned at the beginning of this description. These functions can be accomplished by means of conventional mechanisms which are well known and are not illustrated in the drawing.

It is to be noted that it is possible to turn the mechanism upside down without thereby altering the direction of the fast modes of operation, i.e., a clockwise rotation for the fast forward mode, and an automatic spring return of the control key to the rest position which occurs for any situation wherein the position of the support 21 is independently moved apart from the capstan (e.g., during the absence of a cassette). An important feature is that the control operation indication takes place by the changing of the position of a single reference, such as a pointer on the button 11 that turns with the control key. This pointer is illustrated as a triangle on the button 11.

The control key according to the invention has been shown and described by way of example, but not in a limitative sense, and in a purely schematic manner. While I have shown and described specific embodiments of this invention, further modifications and improvements will occur to those skilled in the art. All such modifications which retain the basic underlying principles disclosed and claimed herein are within the scope of this invention.

I claim:

1. In tape recorders having a frame, a tape drive variator (controller), and a movable support mounting at least one of a pressure roller and magnetic head on the frame, a single control key comprising:
   a shaft rotable about its axis;
   an outer body fixed to said shaft for manually rotating said shaft;
   a cam means fixed to said shaft, said cam means having a substantially rectangular cross section about said shaft axis in a plane perpendicular to said shaft axis;
   projecting tabs connected to and rotatable with said shaft and spaced apart through a substantial angle of rotation of said shaft;
   first cam follower means located adjacent to and coacting with said cam means for being positioned in response to the rotational position of said cam means; and
   second follower means having a portion located radially between and coacting with said projecting tabs for being positioned in response to the rotational position of said tabs;
   whereby the rotational position of said cam means controls one function of said tape player which is determined by the position of said first cam follower means and the rotational positions of said tabs control another function of said tape player which is determined by the position of said second follower means.

2. A single control key according to claim 1 in which said first cam follower means includes a lever fulcrumed to the frame with an end for engaging said cam means, and spring means which urge said end of said lever against the rectangular cross-sectional cam means.

3. A single control key according to claim 2, wherein said lever has a free end, opposite to the one end in contact with the cam means, said free end positioned such that a suitable gap exists between said free end and a projection of said movable support for at least one rotational position of said cam means, and said gap being closed when said lever moves as a result of the rotation of said cam means by said shaft from said one rotational position.

4. A single control key according to claim 1, wherein said tabs are provided on said cam means and wherein said substantial angle is approximately 90°.

5. A single control key according to claim 1 in which said second follower means includes an actuating lever of a tape drive variator (controller) and in which said portion comprises an end of said actuating lever projecting between the said tabs, said tabs coming into contact with said end of said actuating lever as a result of rotation of said cam means and shaft.

6. A single control key according to claim 3 in which said second follower means includes an actuating lever of a tape drive variator (controller) and in which said portion comprises an end of said actuating lever projecting between the said tabs, said tabs coming into contact with said end of said actuating lever as a result of rotation of said cam means and shaft.

7. A single control key according to claim 6, wherein said actuating lever and said movable support are each biased by spring members, said spring members coacting with said spring means acting on said lever fulcrumed to the frame for positioning the latter lever and the movable support controlled by the last mentioned lever into predetermined positions as a function of the rotational position of the shaft of the control key.

8. A single control key according to claim 5, wherein the said tabs come into contact with said actuating lever after a rotation of said shaft about said axis through about 45° in any direction from a first rotational position, a further rotation of about another 45° of said control key shaft providing for moving a magnetic head and pressure roller support by means of said cam means and said first cam follower means and successively moving said actuating lever.

9. A single control key for tape recorders according to claim 1 wherein the shaft and the control key are axially slideable for effectuating additional control operations of a tape recorder simultaneously while the first cam follower means and second follower means independently control operating modes of the tape player effectuated by rotating said shaft about said axis.

10. A single control key according to claim 1, wherein said first cam follower means comprises a lever which is fulcrumed to said frame and has an end biased against said cam means by a spring means, the rotational position of said cam means controlling the position of said lever, wherein the position of said lever controls a mode of operation of said tape player and wherein the rectangular shape of said cam means forms an outer rectangular peripheral shape for said cam means which contacts said end and provides for control of said lever position by clockwise and counterclockwise rotation of said shaft about said axis.

* * * * *